(12) United States Patent
Krenn et al.

(10) Patent No.: US 11,747,253 B2
(45) Date of Patent: Sep. 5, 2023

(54) MEASURING DRIVE HAVING ULTRASOUND-MOUNTED SHAFT, MEASURING DEVICE, METHOD AND USE

(71) Applicant: Anton Paar GmbH, Graz (AT)

(72) Inventors: Michael Krenn, Zettling (AT); Denis Schütz, Graz (AT)

(73) Assignee: Anton Paar GmbH, Graz (AT)

( * ) Notice: Subject to any disclaimer, the term of this patent is extended or adjusted under 35 U.S.C. 154(b) by 193 days.

(21) Appl. No.: 17/309,519

(22) PCT Filed: Dec. 4, 2019

(86) PCT No.: PCT/EP2019/083714
§ 371 (c)(1),
(2) Date: Jun. 3, 2021

(87) PCT Pub. No.: WO2020/126510
PCT Pub. Date: Jun. 25, 2020

(65) Prior Publication Data
US 2022/0011210 A1 Jan. 13, 2022

(30) Foreign Application Priority Data

Dec. 21, 2018 (AT) .............................. A 51153/2018

(51) Int. Cl.
*G01N 11/14* (2006.01)
*G01N 11/00* (2006.01)
*F16C 32/06* (2006.01)

(52) U.S. Cl.
CPC .......... *G01N 11/14* (2013.01); *F16C 32/0611* (2013.01); *G01N 2011/0006* (2013.01)

(58) Field of Classification Search
CPC ...... G01N 11/14; G01N 11/16; G01N 11/142; G01N 11/162; G01N 11/10; G01N 11/165; G01N 11/167; G01N 2011/145
See application file for complete search history.

(56) References Cited

U.S. PATENT DOCUMENTS 3,519,095 A * 7/1970 Tomes ..................... G01G 7/04
177/21 OR
4,524,611 A * 6/1985 Richon .................. G01N 11/14
73/54.35
(Continued)

FOREIGN PATENT DOCUMENTS

| AT | 404192 B | 9/1998 |
| AT | 515219 B1 | 7/2015 |

(Continued)

OTHER PUBLICATIONS

ESPACENET Machine Translation of CN 104454986 A Which Originally Published on Mar. 25, 2015. (Year: 2015).*

(Continued)

*Primary Examiner* — David A. Rogers
(74) *Attorney, Agent, or Firm* — Robert A. Blaha; Smith Tempel Blaha LLC

(57) ABSTRACT

Described is a measuring drive for a measuring instrument, in particular a rheometer. The measuring drive has: i) a motor, ii) a shaft, which is coupled to the motor in such a way that the shaft is drivable by the motor, and iii) an ultrasonic device, which is configured to provide ultrasound to the shaft in such a way that at least a part of the shaft is bearable substantially without contact by the ultrasound. Furthermore, the measuring instrument, a method, and a using are described.

20 Claims, 3 Drawing Sheets

(56) References Cited

U.S. PATENT DOCUMENTS

| | | | | |
|---|---|---|---|---|
| 4,878,379 | A | * | 11/1989 | Deer ................. G01N 11/10 73/54.39 |
| 5,777,215 | A | * | 7/1998 | Calatzis ........... G01N 33/4905 73/64.41 |
| 6,167,752 | B1 | * | 1/2001 | Raffer ............... G01N 11/142 73/843 |
| 7,137,290 | B2 | * | 11/2006 | Doe ................. G01N 11/142 73/54.35 |
| 7,526,941 | B2 | * | 5/2009 | Doe ................. G01N 11/14 73/1.02 |
| 7,876,022 | B2 | | 1/2011 | Petrenko et al. |
| 8,110,967 | B2 | | 2/2012 | Ting et al. |
| 8,183,742 | B2 | | 5/2012 | Zhelyaskov et al. |
| 8,453,496 | B2 | * | 6/2013 | Lauger ............. G01N 11/142 73/54.28 |
| 8,904,852 | B2 | * | 12/2014 | Wollny ............. G01N 11/142 73/54.32 |
| 10,031,057 | B2 | * | 7/2018 | Romirer ........... G01N 11/14 |
| 10,444,134 | B2 | * | 10/2019 | Gajji ................. G01N 11/14 |
| 11,644,401 | B2 | * | 5/2023 | Leyser .............. G01N 33/86 435/13 |
| 2010/0289362 | A1 | | 11/2010 | Petrenko et al. |
| 2014/0311224 | A1 | | 10/2014 | Läuger et al. |
| 2015/0233807 | A1 | | 8/2015 | Santner |
| 2016/0341647 | A1 | * | 11/2016 | Krenn ................ G01D 3/08 |
| 2017/0016878 | A1 | | 1/2017 | Khismatullin et al. |
| 2018/0245635 | A1 | | 8/2018 | Platzek et al. |

FOREIGN PATENT DOCUMENTS

| | | | |
|---|---|---|---|
| CN | 1434224 | A | 8/2003 |
| CN | 104454986 | A * | 3/2015 ............ F04C 23/02 |
| CN | 104895827 | A | 9/2015 |
| CN | 205265560 | U | 5/2016 |
| CN | 107269697 | A | 10/2017 |
| DE | 10034116 | B4 | 2/2004 |
| DE | 10247783 | B4 | 8/2013 |
| DE | 10 2014107493 | B3 | 8/2015 |
| EP | 0 442 596 | B1 | 12/1994 |
| EP | 228731 | B2 | 6/1995 |
| EP | 2389521 | B1 | 8/2014 |
| GB | 1018638 | A | 1/1966 |
| JP | 2007321811 | A | 12/2007 |
| JP | 2018126967 | A | 8/2018 |
| KR | 101604989 | B1 | 3/2016 |
| WO | 2010083813 | A1 | 7/2010 |

OTHER PUBLICATIONS

Atherton et al.; "Some Fundamental Aspects of Self-Levitating Sliding Contact Bearings and Their Practical Implementations"; Proceedings of Institute of Mechanical Engineers Part J; J Engineering Trilogy; 2014; vol. 228(9); pp. 916-927.

Office Action in Application No. A 51153/2018; pp. 1-4; dated Jul. 11, 2019; Austrian Patent Office; Dresdner Strape 87, PF 95, 1200 Vienna, Austria.

Moulara, G.; Written Opinion of the International Search Authority in Application PCT/EP2019/083714; pp. 1-10; European Patent Office; PB 5818; 2280 HV Rijswijk, Netherlands, dated Jun. 25, 2020.

* cited by examiner

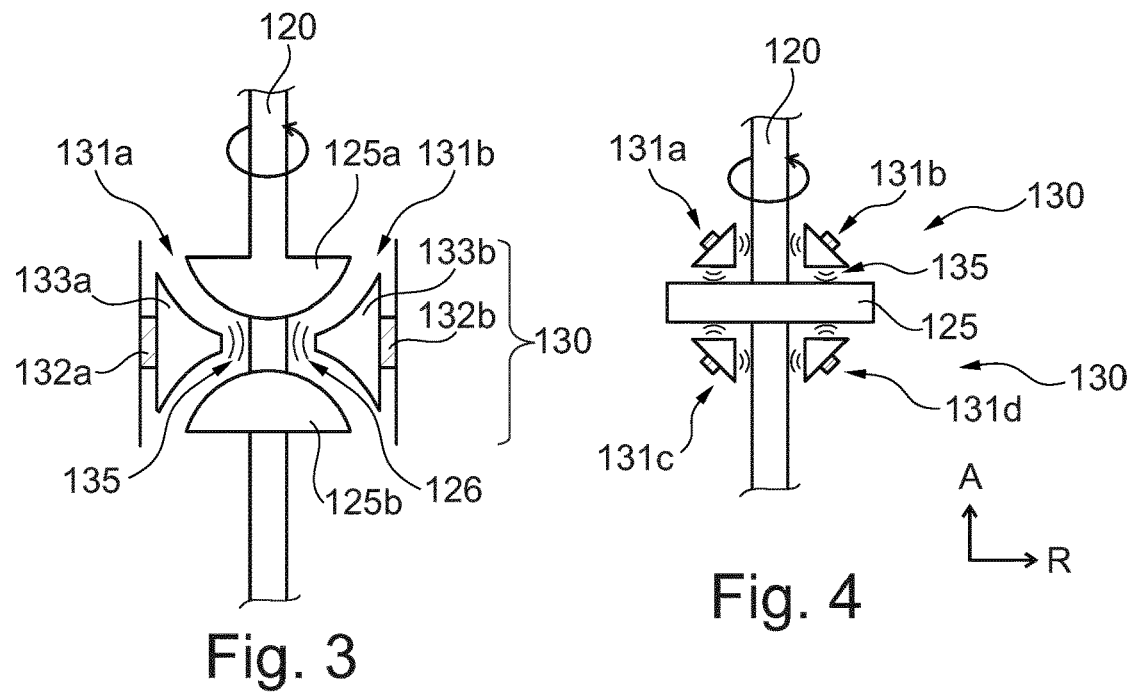
Fig. 3
Fig. 4
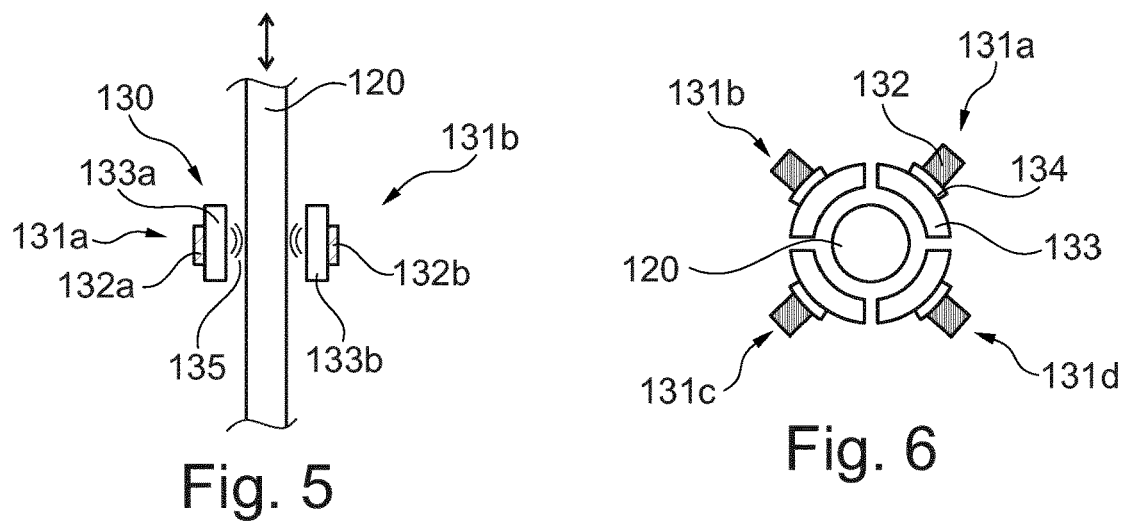
Fig. 5
Fig. 6
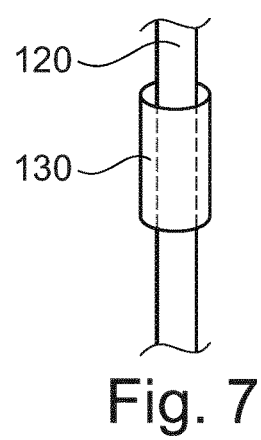
Fig. 7

MEASURING DRIVE HAVING ULTRASOUND-MOUNTED SHAFT, MEASURING DEVICE, METHOD AND USE

CROSS-REFERENCE TO RELATED APPLICATION

The present application is a national phase application derived from the international patent application PCT/EP2019/083714, filed Dec. 4, 2019, which claims the benefit of the filing date of the Austrian patent application AT A 51153/2018, filed Dec. 21, 2018, both of which are incorporated herein by reference in their entirety.

TECHNICAL FIELD

The invention relates to a measuring drive for a measuring instrument, in particular a rheometer. Furthermore, the invention relates to the measuring device for determining a sample property, in particular a rheological and/or dynamic mechanical property. Furthermore, the invention relates to a method and a use.

TECHNOLOGICAL BACKGROUND

The mode of operation of a measuring device, in particular a rheometer, for determining a rheological property of a sample is known in principle and is described, for example, in the documents AT 404 192 B or AT 515 219 B1. Briefly outlined, a sample (usually a liquid) is provided and held between two measuring parts, wherein at least one measuring part is connected to a shaft. The shaft is made to rotate by a measuring motor, wherein the rheological properties of the sample affect the rotational movement of the shaft, in particular the acting torsional moment and the normal force. The acting torsional moment is usually determined from the motor current of the measuring motor or from mechanical springs. The occurring normal force can be measured in various ways (e.g. capacitively, optically), so that conclusions about the rheological properties of the sample are enabled. For dynamic mechanical tests, the rotation of the measuring motor is combined with a translatory movement of a further measuring body as the case may be. The shaft may have a disc (oriented perpendicular to the axial direction of the shaft), whereby the measuring accuracy can be further improved. The disc and/or at least a part of the shaft is here arranged in an air gap and is mounted friction-free by additionally introduced compressed air (air bearing) or a magnetic bearing. A bearing involving friction is further possible via ball bearings or tip bearings.

However, this implementation has many disadvantages, in particular if the measurement is to be carried out under special conditions, for example high pressures. An air bearing cannot be used in closed pressure chambers, because a pressure cell would be subject to pressure fluctuations, which could not be sufficiently corrected by conventional means in the case of a compressed air supply. Likewise, applications in ultra-clean rooms, mobile applications and, above all, applications where compressed air can cause electrostatic problems are also not possible. For example, compressed air application is prohibited on offshore drilling platforms because the electrostatic charges can lead to ignition sparks.

The use of a conventional rheometer in inert environments (e.g. argon gloveboxes) is also very disadvantageous, because conventional air bearings with fluid rates of 200 L/min can only be introduced into the ultra-clean room and/or in inert environments at very high expenditures. Namely, the high flow rate causes many technical problems in such closed rooms. Furthermore, the high flow rates of the air bearings also cause many disadvantages in contaminated measurement areas (e.g. radioactive environment, poisons, highly reactive gases, etc.).

SUMMARY

There may be a need to provide a measuring drive for a measuring device, in particular a rheometer, which enables a robust and efficient measurement even under special measurement conditions (e.g. pressure cell, ultra-clean room, inert environment, areas decoupled from compressed air).

This need may be satisfied by the subjects having the features according to the independent patent claims. Further embodiment examples are shown in the dependent claims.

According to an aspect of the present invention, a measuring drive for a measuring device (in particular a rheometer) is described. The measuring drive has: i) (at least) one motor (in particular a measuring motor), ii) (at least) one shaft which is coupled to the motor in such a way that the shaft is drivable by the motor, and iii) an ultrasonic device, which is configured to provide ultrasound to the shaft in such a way that the shaft (and/or at least a part of the shaft) is bearable (or supportable) (substantially) without contact (or non-contactingly) by the ultrasound.

According to a further aspect of the present invention, a measuring device (in particular a rheometer) for determining an information that is indicative of the rheological properties of a sample (in particular a visco-elastic sample, further in particular a liquid) is described. Herein, the measuring device has: i) the measuring drive described above, and ii) a sample carrier for positioning the sample, wherein the shaft is couplable to the positioned sample.

According to a further aspect of the present invention, a using of the above-described measuring device is described in a special measurement environment, e.g. in a clean room (and/or ultra-clean room), a pressure chamber, an inert environment, or a chamber decoupled from pressurized air.

According to a further aspect of the present invention, a method is described for determining an information that is indicative of the rheological properties of a sample (in particular a visco-elastic sample, further in particular a liquid), by a measuring device (in particular a rheometer). The method has: i) providing the sample and coupling the sample to a shaft, ii) driving (e.g. rotating) the shaft by a motor (in particular a measuring motor), so that the indicative information is transferred to the movement characteristic (e.g. the torsional moment and/or the normal force) of the shaft, (iii) emitting ultrasound by an ultrasonic device to the shaft in such a way that at least a part of the shaft is beared (or supported) substantially without contact (or non-contactingly) by the ultrasound, and (iv) detecting the movement characteristic of the shaft (e.g. by current consumption of the measuring motor, by capacitive measurement of the normal force, by measurement of the axial displacement of the linear motor) to determine the information indicative of the rheological properties of the sample.

According to another aspect of the present invention, a using of an ultrasonic source for (substantially) without contact bearing (or supporting) of (at least a part of) a shaft in a measuring device (in particular a rheometer) is described.

OVERVIEW OF EMBODIMENTS

In the present document, the term "measuring drive" may in particular refer to a device, which may be installed in a measuring device, and which may provide a physical or mechanical movement that may be necessary for the performing of a measurement in the measuring device. These movements may be rotary and/or rotary oscillatory and/or translatory and/or translatory oscillatory and/or combinations thereof. By combining two measuring motors, arbitrary combinations of movements may be prescribed, wherein the sample may be mechanically stressed and measured between two measuring parts. According to an embodiment example, a measuring drive may have a (measuring) motor, in particular a rotary or linear motor, which may provide a rotary or linear movement. For this purpose, the motor may, for example, be coupled to a shaft, wherein the term "shaft" may in particular refer to a component, which may extend significantly longer in one spatial direction than in the other two spatial directions. For example, a shaft may be formed as a (rotatable) rod. Furthermore, a shaft may also be formed e.g. as a tube or a rectangular rod. In an embodiment example, this shaft may be coupled (e.g. mechanically, magnetically, etc.) to the motor within the measuring drive, and may be couplable directly or indirectly to a sample within the measuring device. Further, a measuring drive may have a device for bearing the shaft. According to a particularly preferred embodiment example, this may concern an ultrasonic device, which may provide ultrasound in such a way that the shaft may thereby be beared without contact.

In this document, the term "measuring device" may in particular refer to a device, which may be configured to measure physical properties of a sample, and may use a measuring drive with a motor-driven shaft for this purpose. Herein, the measuring device may measure an information that may be indicative of the physical/chemical properties of the sample by the shaft, which may be directly or indirectly coupled to the sample. Herein, the indirect coupling of the sample with the shaft may be carried out with measuring parts on the shaft, wherein different measuring part systems are known, such as for example plate-plate arrangements, cone-plate arrangements, as well as concentric cylinder arrangements up to solid body clampings for e.g. strain tests. The measuring device may thus be, for example, a "rheometer", which in turn may be configured to determine the rheological properties of a sample. Herein, the term "rheometer" may comprise, for example, a rotational viscometer, a rotational rheometer, an oscillatory rheometer, or a combined rotational and oscillatory rheometer, as well as arrangements for dynamic mechanical analysis with linear load.

In this document, the term "rheological property" may in particular refer to a property of a sample, in particular a liquid, which may concern the deformation and/or flow behavior of the sample. Herein, a rheological property may be, for example, the viscosity, the elasticity, or the viscoelasticity of the sample. In this document, the term "indicative information" may in particular refer to a measurand, which may be detectable by a measuring unit. For example, as described above, the rheological property of a sample (which may be coupled to a rotating shaft) may affect the movement characteristics of the rotating shaft. Thus, for example, the acting torque or the normal force may change according to the visco-elastic properties of the sample. This change in the movement characteristic would then correspond to an indicative information, which may be detected with a measuring unit (e.g. by motor current, adjusting rotation angle, or capacitively). From the indicative information, conclusions about the rheological property of the sample may then in turn be drawn.

In this document, the term "substantially without contact (or non-contactingly)" may in particular mean that there may be no physical contact between at least a part of a beared shaft, for example a shaft section or a shaft element, and a surrounding measuring drive and/or a surrounding measuring device. In other words, at least a part of the shaft in a non-contacting beared state may have no physical/mechanical contact with another solid body. Instead, the shaft may be levitated by the emitted ultrasound, which may be emitted by an ultrasonic device. Thus, in principle, at least part of the wave may "float" contactlessly or frictionlessly.

As used herein, the term "ultrasonic device" may particularly refer to any device, which is capable to generate an ultrasound (pressure) in such a way that at least a part of a shaft may be beared substantially contactlessly. The ultrasonic device may comprise one or more ultrasonic sources, which may be spatially separated from each other. These may, for example, be positioned opposite to each other on both sides of the shaft. Herein, an ultrasonic source may be a single device, which may be configured to provide the described ultrasound. Such a device can, in addition to an ultrasonic emitter, also may have, for example, a so-called sonotrode and/or a horn.

The term "ultrasound" may refer in particular to high-frequency mechanical vibrations, wherein the frequencies may lie outside of the audible spectrum, substantially in the range 15 to 100 kHz. The ultrasonic device may be configured for contactlessly handling of elements, such as a shaft, by ultrasound and/or ultrasonic levitation. In principle, two possibilities are known for this, the standing wave effect in the ultrasonic field and the near field effect in the ultrasonic field (see below). In principle, in the present context, the term ultrasound may refer to an ultrasonic vibration or an ultrasonic pressure, which may be generated/provided in such a way that levitation of an object, in particular at least a part of a measuring wave, is enabled. Ultrasonic emitters/generators may be used for generating ultrasound in air. These may be, for example, dynamic and electrostatic loudspeakers as well as, in particular, piezo loudspeakers. In this context, piezo loudspeakers may be, for example, membrane-coupled plates made of piezoelectric ceramics, which may be excited to vibrations by the inverse piezo effect.

According to an exemplary embodiment example, the invention may be based on the idea that a measuring drive for a measuring device, in particular a rheometer, may be provided, which may enable a robust and efficient measurement even under very special measurement conditions such as pressure cell, ultra-clean room, inert environment, or areas decoupled from compressed air, if a bearing without contact of (at least part of) the shaft is provided via an ultrasonic device. Until now, the bearing of a measuring device shaft may have been realized by compressed air, by which however many special measurement conditions may have been made impossible or at least significantly more difficult. It has now been surprisingly found that a particularly advantageous measuring drive for a measuring device may be made possible by the application of ultrasonic levitation. Although the physical phenomenon of ultrasonic levitation is known in principle and has been used for the handling of special very small/light components, such as foils or wafers, it may have though been unknown until now that the handling without contact of a measuring shaft (not a sample) in a measuring device may turn out to be particularly advantageous for very special measurement conditions, such as a pressure cell or an ultra-clean room, which until now could only be realized technically problematically and at great expense.

In contrast to the hitherto existing compressed air bearing of a shaft in a rheometer, the use of an ultrasonic device may be considerably favorable. No gas flow (compressed air) and no preparation of this gas may be necessary any more. By this, lower costs may be caused and less energy may be consumed. Due to the independence from compressed air, the measuring device may be mobile, independently and flexibly operational. In this way, even a use in a completely closed environment (e.g. pressure cell or pressure chamber) may be made possible. Furthermore, porous materials may no longer be needed, and the design may be simpler and more robust (also due to higher air gaps). Instead of compressed air, other gases may be introduced into the air gap (e.g. argon), which may further increase the load capacity. But the ultrasonic device in a measuring drive may also offer clear advantages over other conventional bearing (or supporting) options, such as ball bearings. For example, the residual friction may be significantly lower and the adjustability may be improved (for example, by angle-constant residual friction curves).

Furthermore, the described measuring drive may be integrated into existing systems in a simple and flexible manner. Furthermore, an indicative information (measurand) may be determined, for example, via a capacitive normal force measurement, and existing drive means (e.g. motor and shaft) may be combined with the described measuring drive.

Additional exemplary embodiment examples of the device and the method are described in the following.

According to an embodiment example, the ultrasonic device may be configured to emit the ultrasound in such a way that at least a part of the shaft may be levitatingly bearable (in particular frictionless levitatingly) by the ultrasound. This may have the advantage that the bearing of the shaft may be robust and though, at the same time, frictionless. Levitation in this context may be understood as letting float by ultrasound without physical contact to another solid body.

According to a further embodiment example, the ultrasonic device may have at least two ultrasonic sources, which may be arranged (substantially) opposite to each other, wherein the shaft may be arranged between the (substantially) opposite ultrasonic sources. This may have the advantage that the ultrasonic device may be designed flexibly and a plurality of advantageous architectures may be made possible.

If ultrasound is emitted from two (or more, e.g. four) mutually opposing ultrasound sources to a shaft, then the bearing may be realized in a particularly stable, balanced, and substantially deflection-free manner.

According to a further embodiment example, the shaft may have a shaft element, which may be coupled to the shaft with its main extension direction (substantially) perpendicular to the axial direction of the shaft, wherein the ultrasonic device may be configured in such a way that the shaft element may be bearable (substantially) without contact by the ultrasound. This may provide the advantage that the measurement accuracy may be increased by the shaft element, while it may be bearable particularly efficiently and for a plurality of special applications.

The wave element may be used to facilitate the measurement of the indicative information and/or to determine it more accurately. For example, the deflection of the ultrasonically beared shaft element may be measured (e.g. capacitively or optically). The shaft element may have a main extension direction, which may be at least longer than one other extension direction of the shaft element. If the shaft element is designed as a disc, for example, then there may be two main extension directions, each of which may be arranged perpendicular to the axial direction of the shaft. The shaft element may be coupled to the shaft, e.g. attached to it.

According to a further embodiment example, the ultrasonic device may be configured to bear (or support) the shaft element substantially without contact both in the axial direction and in the radial direction of the shaft. This may have the advantage that both the normal force and the transverse force may be absorbed, as well as a tilting moment. Thereby, the measurement may be carried out even more efficiently with greater stability of the shaft element.

According to a further embodiment example, the ultrasonic device may have at least four ultrasonic sources, wherein, viewed in the axial direction of the shaft, two ultrasonic sources may be arranged above and two ultrasonic sources may be arranged below the shaft element, and wherein, viewed in the radial direction of the shaft, two ultrasonic sources may be arranged substantially opposite to the other two ultrasonic sources, with the shaft therebetween. This may provide the advantage that the above-described bearing (of the shaft element) in the axial direction and the radial direction may be realized in a simple way.

According to a further embodiment example, the shaft may have at least two shaft elements, which may be spatially spaced apart from each other and thereby form an interspace. The ultrasonic device may have at least two ultrasonic sources, which may be arranged (substantially) opposite to each other in such a way that emitted ultrasound at least partially may impinge on the interspace, whereby the at least two shaft elements may be bearable (substantially) without contact. This may have the advantage that a particularly efficient and robust bearing (or supporting) may be provided.

According to a further embodiment example, at least one shaft element (or both shaft elements) may substantially have a shape, which may be selected from the group that may consist of a disc, an annular disc, a plate, a truncated cone, a hemisphere, or a truncated pyramid. This may have the advantage that a flexible design for special applications may be made possible. The mentioned list may be exemplary and not exhaustive. Other advantageous embodiments of the shaft element may also be conceivable.

According to a further embodiment example, the ultrasonic source may have an ultrasonic emitter and a sonotrode, wherein the sonotrode may be arranged in front of the emitter in the direction of sound emission. This may have the advantage that a particularly efficient ultrasonic source with specially adjustable properties may be used.

In this context, any device, which may be configured up to generate ultrasound with a specific frequency, may be referred to as an ultrasonic emitter (or ultrasonic generator). A device may be referred to as a sonotrode, which device may be set into resonant vibration by the introduction (of ultrasound). A sonotrode may establish a connection between the ultrasonic emitter and the workpiece, and may adapt the ultrasonic vibration to a machining task.

According to a further embodiment example, the ultrasonic source further may have a horn, which may be arranged between the emitter and the sonotrode. This may also have the advantage that a particularly efficient ultrasonic source with specially adjustable properties may be used.

In this context, a sonotrode having a specific shape or an additional component, which may be arranged between the ultrasonic emitter and the sonotrode, may be referred to as a horn. Between the ultrasonic emitter and the sonotrode, the horn may amplify the amplitude of the ultrasonic emitter. Material and geometry may be chosen in such a way that the horn as a mechanical part may have as natural frequency (or resonance frequency) the frequency of the emitter and/or a multiple thereof. The material should preferably have the right propagation speed for the ultrasound, and should dampen it only slightly.

According to a further embodiment example, the ultrasonic device may be a standing wave effect ultrasonic device and/or a near field effect ultrasonic device. In this way, the specific advantages of each method may be exploited or even combined. Thus, the load capacity and the self-centering (in axial direction) may be improved.

In the case of a standing wave effect ultrasonic device, a reflector may be placed opposite to an ultrasonic source at a distance of an integer multiple of half the wavelength. Thereby, the emitted ultrasonic wave may be reflected back on itself, and standing waves of the sound particle velocity and the pressure change may be generated, wherein the nodes of the sound particle velocity may be the bellies of the pressure change. An object, such as a measuring shaft (or at least a part of it, such as a shaft element) may now be beared in the nodes of the sound particle velocity.

In the case of a near-wave effect ultrasonic device, an object, such as a measuring shaft (or at least a part thereof, such as e.g. a shaft element), may be brought very close to an ultrasonic source. Thereby, an effect similar to that in a fluid dynamic bearing may develop, the gas may be compressed in the gap. Since, depending on the quality and construction of the sonotrode, a high amplitude (2 to 15 μm) of the vibration generator could also be necessary, the gap may not become very small (e.g. in the range of a distance of 50 to 500 μm).

According to a further embodiment example, the motor may be a rotational (measuring) motor, which may be configured to rotate the shaft, which may be a measuring shaft, in the radial direction. This may have the advantage that the described device may be directly integrated into established systems.

According to a further embodiment example, the motor may be a linear (measuring) motor, which may be configured to move the shaft, which may be an actuating (or adjusting) shaft, in the axial direction, in particular linearly. This may have the advantage that a particularly efficient and accurate measuring device may be provided.

According to a further embodiment example, the sample carrier may be arranged between the measuring shaft and the actuating shaft, in particular wherein the measuring shaft and the actuating shaft may be substantially opposite to each other, seen in the axial direction. This may have the advantage that a particularly (measuring) efficient measuring device may be provided, in which, for example, both shafts may be at least partially ultrasonically beared.

With reference to FIG. 8, an embodiment example of a corresponding measuring device is described below, which may have a measuring shaft and an actuating shaft, wherein the sample carrier may be arranged between the two shafts. According to an embodiment example, the actuating shaft may be centered particularly well by ultrasonic sources, and may be beared substantially without deflection. Furthermore, as described above, the measuring shaft may be advantageously ultrasonically mounted, in particular via a shaft element.

According to a further embodiment example, the measuring device further may have a measuring unit, in particular a capacitive measuring unit, for measuring (in particular capacitively) the indicative information on the shaft element. This may have the advantage that established systems may be integrated directly into the described measuring device.

Corresponding measuring units may be known to the skilled person. However, it may be quite surprising in the present context that established measuring units may function in efficient interplay with the concept of ultrasonic bearing (or supporting) of a measuring shaft.

According to a further embodiment example, the measuring device further may have a hermetically (in particular fluid-tight) lockable cell, e.g. a pressure cell, wherein at least a part of the ultrasonic device, at least a part of the shaft, and the sample carrier may be arranged in the hermetically lockable cell. In terms of the process, the measuring device may be at least partially introduced in the cell. This may have the advantage that a very special measurement environment can be provided particularly efficiently and without high expenses.

In this context, the term "hermetically locked" may mean in particular fluid-tight. The cell may be used for special measurement conditions, for example particularly high pressures. For this purpose, a pressure cell may be used, in which the measuring device or at least a part of the measuring device may be placed. The pressure cell may be pressurized with a pressure profile (e.g. by a pressure container) in order to create a specific predetermined pressure in the cell.

According to a further embodiment example, the measuring device may further have a pressure container for applying a pressure profile to the hermetically lockable cell. This may have the advantage that a pressure profile may be realized in the pressure cell particularly efficiently and robustly.

According to a further embodiment example, in the method the hermetically locked cell may be at least partially filled with a gas, which may have a higher density than air (e.g. argon). This may have the advantage that the stiffness of the bearing is increased.

If the entire rheometer (or at least a part of it) is introduced in a closed space (e.g. a sample chamber), then it may also be purged here with denser gases than air. If no particularly high flow rates (as with compressed air) are required, a sample chamber may be purged with a gas such as argon. Thereby, the stiffness of the fluid bearing may be increased.

According to a further embodiment example, the measuring device or at least a part thereof (e.g. at least a part of the ultrasonic device, at least a part of the shaft, and the sample carrier) may be used in a special measurement environment. A special measurement environment may, in this context, be, for example, a clean room (and/or an ultra-clean room), a pressure room (e.g. pressure chamber or pressure cell), an inert environment, or a chamber decoupled from compressed air. This list may be exemplary and not exhaustive.

The term "(ultra-)clean room" may refer to a measurement environment, in which the concentration of the (airborne) particles may be kept very low. Parameters, such as temperature, humidity and pressure, may be usually kept constant herein in order to create comparable conditions at all times. In order to create the desired conditions, the following may be often used: vacuum pumps, adapted work clothing, special work equipment and tools. For clean rooms, especially ultra-clean rooms, there may be plural hierarchical areas with corresponding clean room classes (e.g. ISO classes).

In this context, the term "pressure chamber" may refer to a measurement environment, in which the pressure may be regulatable. Such a pressure chamber may be hermetically locked (in particular fluid-tightly) during operation. A smaller, in particular at least partially mobile, unit of a pressure chamber may also be referred to as a pressure cell.

The term "inert environment" may refer to a measurement environment, which may be locked hermetically and fluid-tightly (or gas-tightly). Within the inert environment, a defined atmosphere may be created for processing sensitive or hazardous materials. For example, an inert environment may be filled with an inert gas (e.g. argon). Thus, an inert environment may be e.g. an argon glove box.

The term "decoupled from compressed air" may in particular refer to a measurement environment, in which no compressed air may be used. For measurements in pressure chambers and/or pressure cells, the use of additional compressed air may cause many technical disadvantages, so that an environment decoupled from compressed air may be desirable here. Furthermore, a use of compressed air on drilling platforms, for example, may be prohibited because the electrostatic charges may lead to ignition sparks.

BRIEF DESCRIPTION OF THE DRAWINGS

In the following, exemplary embodiment examples of the present invention are described in detail with reference to the following drawings.

FIG. 3, FIG. 4, FIG. 5, FIG. 6 and FIG. 7 show exemplary embodiments of a shaft and the ultrasonic device of the invention.

DETAILED DESCRIPTION OF ILLUSTRATED EMBODIMENTS

Figure 1:
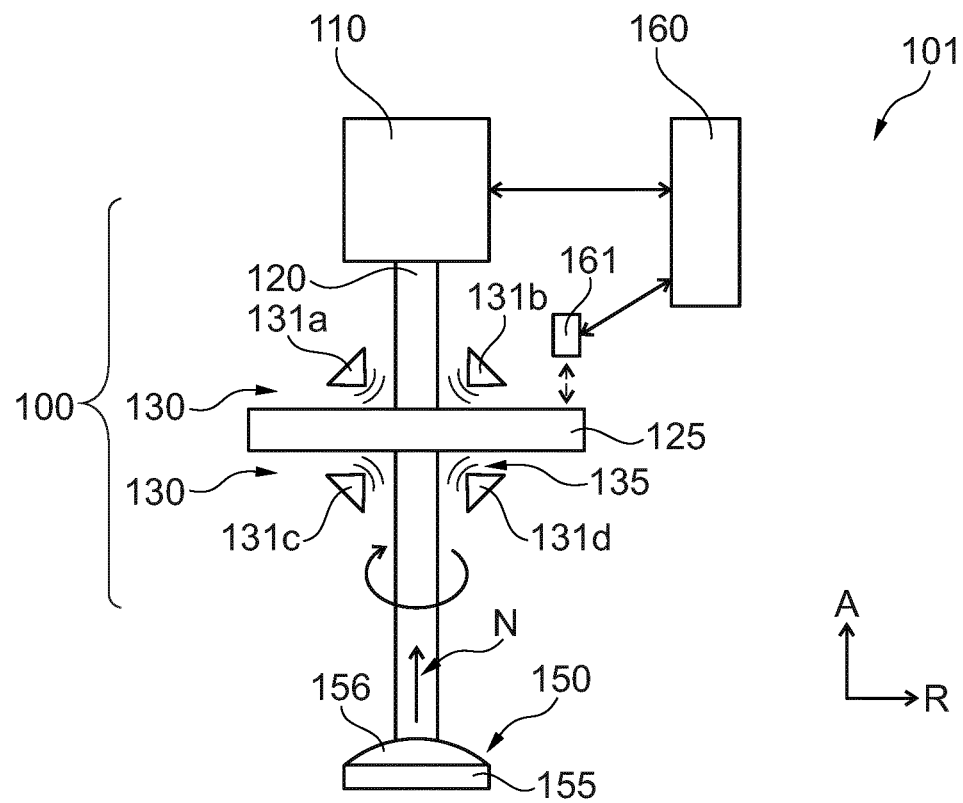
FIG. 1 shows a measuring device having a measuring drive according to an exemplary embodiment example of the invention.

Identical or similar components in different figures are provided with the same reference numerals.

Before exemplary embodiment examples of the invention are described with reference to the figures, some general aspects of the invention will be explained.

According to an exemplary embodiment example, the bearing (or supporting) of the measuring drive in a rheometer via an ultrasonic bearing provide the following advantages over conventional air bearings: i) no "flowing" gas (e.g. compressed air) necessary, ii) cheaper because no air treatment is necessary, iii) mobile and independent of availability of compressed air, iv) applicable in a completely closed environment (e.g. pressure chamber), v) simpler design (no porous materials necessary), vi) more robust due to higher air gaps, vii) lower energy consumption in comparison to compressed air. Compared to conventional ball bearings, there may be the advantages of lower residual friction and better adjustability (constant-angle residual friction curves).

According to an exemplary embodiment example, the bearing of the measuring drive in a rheometer via an ultrasonic bearing may provide the following further advantages: i) alternative bearing forms for easier manufacturability (e.g. double-spherical, double-conical), (ii) combinable with the capacitive normal force measurement, (iii) combinable with the known drive technology, (iv) scalable (normal force and transverse force stiffness), (v) load capacity can be increased to alternative gases (e.g. argon), (vi) possible improvement of the bearing properties by exploiting and combining the standing wave effect and the near field effect.

According to an exemplary embodiment example, an ultrasonic bearing may be in use in a multi(plural)drive rheometer (air bearings were previously in use). At least two, preferably four, ultrasonic sources may be arranged on the shaft of a linear motor, which in combination with flat cantilevers hold the measuring shaft (linear feed, deflection either limited linear or in oscillation). For this purpose, the ultrasonic emitters with corresponding horns may be mounted opposite to each other in the air gap. Gap geometry may be optimized here so that the stiffness may be sufficient for the rheometer. The load-bearing capacity may be reinforced by gases of higher density, or by the combination of lift and push modes for the bearing. On the bottom side, the bearing may be operated in the push mode, thus the countermovement to gravity may be amplified. On the top side, the bearing may be operated in the lift mode in an attracting manner. Thereby, the centering in the rotation bearing may be improved.

According to an exemplary embodiment example, the acting torque may be a central parameter for the rheological measurements. The torque may be either determinable from the angle of rotation in the case of a motor axis with a spring-loaded arrangement (e.g.: Brookfield type viscometer), or it may be measured by the motor current consumption for a certain speed (depending on the motor type, the torque M may be proportional to current I or $I^2$). The normal force or axial deflection may play a central role in dynamic mechanical analysis with linear deflections, but also in the rotational test procedure when the rotary movement may cause additional axial forces (for example Weissenberg effect).

FIG. 1 shows a rheometer 101 for determining an information that may be indicative of the rheological properties (e.g. the viscosity) of a sample 150 (in the present case a liquid). The measuring device 101 may have a measuring drive 100 having a motor 110, a shaft 120, and an ultrasonic device 130. The shaft 120 may be coupled to the motor 110 in such a way that the shaft 120 may be drivable by means of the motor 110. Thus, the motor 110 may be a rotary motor and may put the shaft 120, which may be a measuring shaft, in rotation. The ultrasonic device 130 may be arranged in the axial direction A of the shaft 120 and may provide ultrasound in such a way that a part of the shaft 120 may be beared without contact by the ultrasound 135.

The rheometer 101 may have a sample carrier 155 onto which the sample liquid 150 may be applied. Herein, the shaft 120 may be coupled to a measuring element 156, configured as a measuring cone, which element may cover the sample 150. Now, when the shaft 120 may rotate, the rheological properties, in particular the viscosity, of the sample liquid 150 may affect the movement characteristics, in particular the torque and/or the angle of rotation and/or the normal force N, of the rotating shaft 120. For capturing these measurands and/or information that may be indicative of the rheological properties of the sample fluid 150. For torque measurement, the prevailing torque may be determined from the current consumption of the measuring motor, and for capturing the normal force N, the rheometer 101 may have a measuring unit 161. In the present case, this may concern a capacitive measuring unit 161, which may carry out a measurement of the normal force N in a known manner via capacitors. The determined data may be forwarded to a control unit 160. The control unit 160 may further be configured to control and/or to regulate the motor 110. In order to advantageously carry out the measurement, the shaft 120 may have a shaft element 125 in the form of a disc, the main extension direction of which, may be arranged perpendicularly in the axial direction A of the shaft 120 on the latter.

In the embodiment example shown, the shaft element 125 in particular may be the part of the shaft 120, which may be beared without contact by the ultrasonic device 130. In this case, the ultrasonic device may be configured to provide and/or emit ultrasound 135 in such a way that the shaft element 125 (and thus also at least partially the shaft 120) may be beared levitatingly, in particular frictionless levitatingly, by the ultrasound. The ultrasonic device 130 may have four ultrasonic sources 131a, 131b, 131c, 131d, wherein, viewed in the axial direction A of the shaft 120, two ultrasonic sources 131a, 131b may be arranged above and two ultrasonic sources 131c, 131d may be arranged below the shaft element 125. Furthermore, viewed in the radial direction R of the shaft 120, two ultrasonic sources 131a, 131c may be arranged substantially opposite to the other two ultrasonic sources 131b, 131d, with the shaft 120 between them. In this preferred embodiment, the ultrasonic device 130 may be configured to bear the shaft member 125 without contact both in the axial direction A as well as in the radial direction R of the shaft 120. The air gap may be filled with a gas having a higher density than air (e.g. argon) in order to achieve a higher rigidity.

Figure 2:
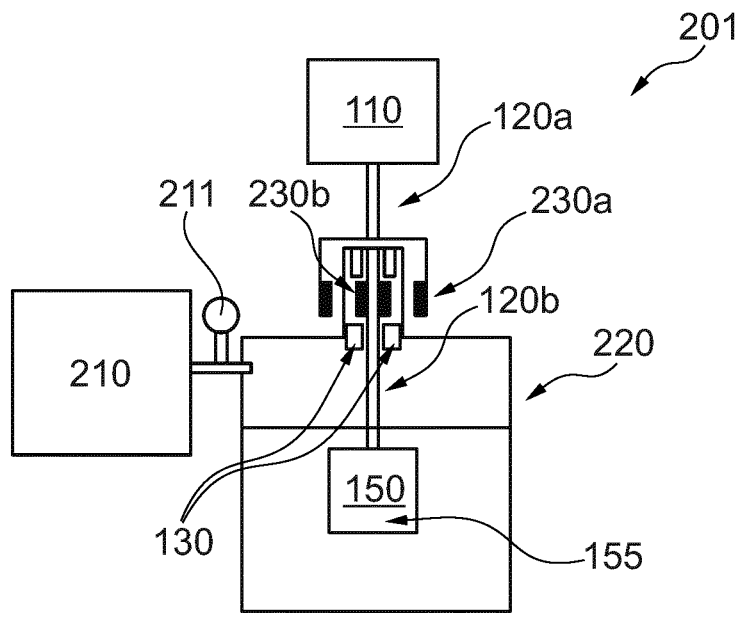
FIG. 2 shows a measuring device having a pressure cell according to an exemplary embodiment example of the invention.

FIG. 2 shows a measuring device 201 according to a further exemplary embodiment example of the invention. The measuring device 201 may additionally have a hermetically (in particular fluid-tight) lockable cell 220, which may concern a pressure cell. A part of the ultrasonic device 130, a part of the shaft 120b, and the sample carrier 155 together with the sample 150 may be arranged in the pressure cell 220. The measuring device 201 may have a pressure container 210 for applying a pressure profile to the pressure cell 220 via a valve 211. For example, the pressure cell 220 may be pressurized by a hydraulic system or similar means.

A second part of the sensing shaft 120b may have magnets 230b at the upper end, which may couple with magnets 230a of a first part of the sensing shaft 120a of the motor 110. The measuring motor 110 may rotate the first part of the shaft 120a with the permanent magnets 230a, and these magnets may couple with the magnets 230b on the second part of the shaft 120a in the closed pressure cell 220. It may be possible with this embodiment to provide a fluid-tight form with ultrasonic bearing.

FIG. 3 shows an exemplary embodiment example of the shaft 120 and two shaft elements 125a, 125b. The two shaft elements 125a, 125b may be arranged on the shaft 120 and may be spaced apart from each other so that an interspace 126 may be formed between the two shaft elements 125a, 125b on the shaft 120. The ultrasonic device 130 may have two ultrasonic sources 131a, 131b, which may be arranged opposite to each other. Each ultrasonic source 131a, 131b may have an emitter 132a, 132b and a sonotrode 133a, 133b, wherein the sonotrodes 133a, 133b may each be directed towards the region of the shaft 120, at which the interspace 126 may be located. The sonotrodes 133a, 133b may be arranged in front of the emitters 132a, 132b in the direction of sound emission. The ultrasound 135 that may be emitted by both ultrasonic sources 131a, 131b may impinge on the interspace 126 from opposite directions, whereby the two shaft elements 125a, 125b may be beared without contact. In the example shown, both shaft elements 125a, 125b may be formed as hemispheres, wherein the interspace 126 may be formed between the rounded surfaces.

FIG. 4 shows an exemplary embodiment example of the shaft 120 and a shaft element 125. The shaft element 125 may be oriented with its main extension direction perpendicular to the axial direction A of the shaft 120 and may be coupled to the same. The ultrasonic device 130 may be arranged in such a way that the shaft element 125 may be beared without contact both in the axial direction A and in the radial direction R of the shaft 120 by the emitted ultrasound 135. For this purpose, the ultrasonic device 130 may have four ultrasonic sources 131a-d. Viewed in the axial direction A of the shaft 120, two ultrasound sources 131a, 131b each may be arranged above and two ultrasound sources 131c, 131d each may be arranged below the shaft element 125. Furthermore, viewed in the radial direction R of the shaft 120, two ultrasonic sources 131a, 131c each may be arranged opposite to each of the two other ultrasonic sources 131b, 131d, with the shaft 120 between them.

FIG. 5 shows an exemplary embodiment example of the shaft 120 and the ultrasonic device 130. The shaft 120 may be a measuring shaft or an actuating shaft and two ultrasonic sources 131a, 131b may be arranged opposite to each other with the shaft 120 in between. In a preferred embodiment example, four ultrasonic sources 131a-d (not shown) may be arranged around the shaft 120, each opposite to each other. The shaft 120 may be formed round (e.g. rod-shaped), but also rectangular. By the emitted ultrasound 135 from the ultrasonic sources 131a, 131b, the shaft 120 may be beared particularly efficiently in a specific position.

FIG. 6 shows a top view of the embodiment example described above for FIG. 5, wherein four ultrasonic sources 131a-d may be arranged around the shaft 120. In this example, the ultrasonic sources 131a-d each may have a horn 134 between the emitter 132 and the sonotrode 133.

FIG. 7 shows an exemplary embodiment example of the shaft 120 and the ultrasonic device 130, wherein the ultrasonic device 130 may be configured as a casing (or envelope) of the shaft 120. Herein, the ultrasonic sources may be mounted within the casing, or the inner side of the casing may serve as an ultrasonic source.

Figure 8:
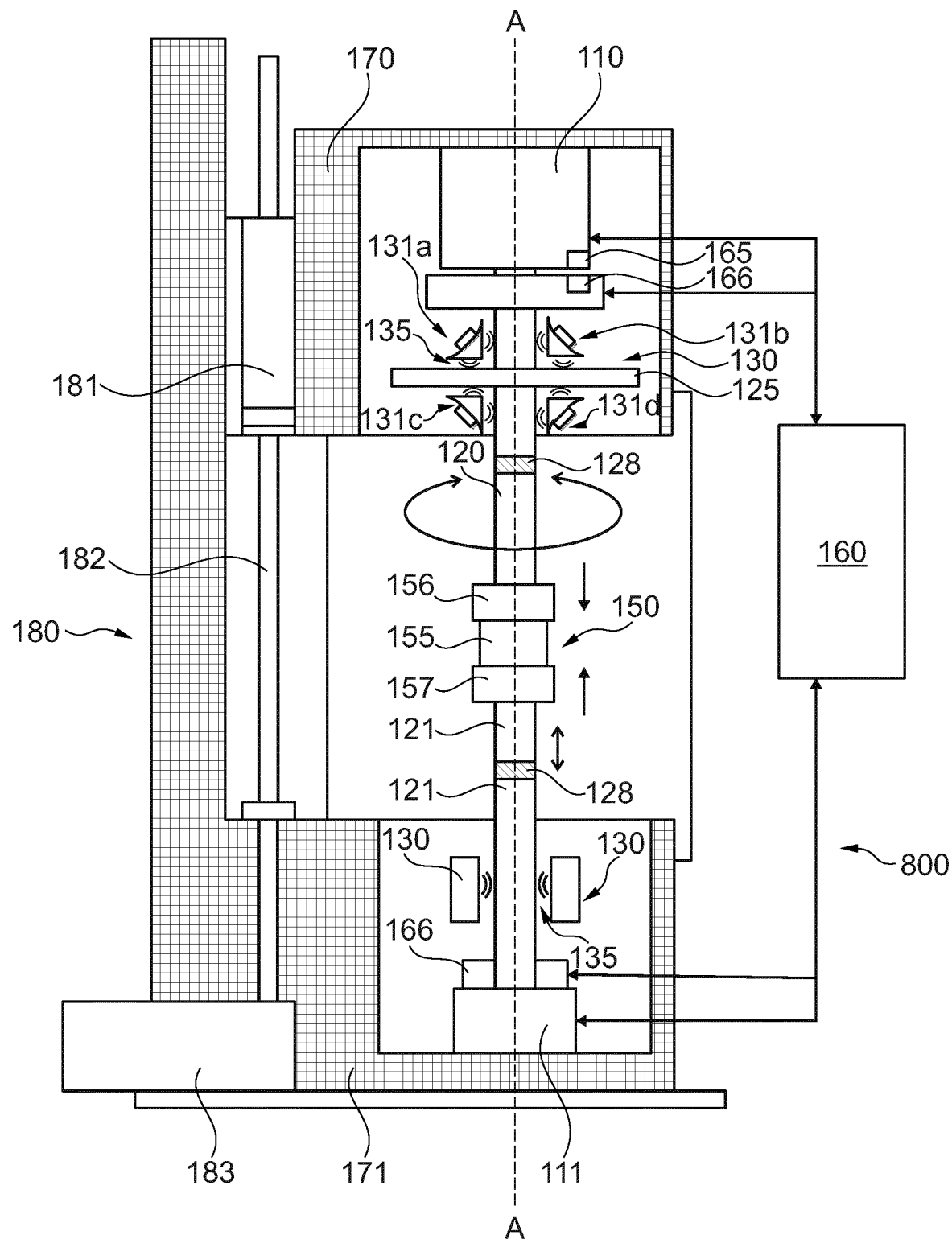
FIG. 8 shows a measuring device having a multiple drive according to an exemplary embodiment example of the invention.

FIG. 8 shows an exemplary embodiment example of a measuring device 800, which may have a measuring shaft 120 and an actuating shaft 121. Such a multi-drive system may use a combination of a linear motor 111, which may drive the actuating shaft 121, and a rotary motor 110, which may drive the measuring shaft 120. Herein, a common control unit 160 may control and/or regulate both the rotary motor 110 and the linear motor 111. In addition, the control unit 160 may monitor (or readjust) the rotation speed or the torque, and may be connected to an angle encoder 166 and a torque detector 165 for this purpose. A sample carrier 155, into which the sample fluid 150 may be introduced, may be arranged between a measuring element 156 at the lower end of the measuring shaft 120 and a measuring element 157 at the upper end of the actuating shaft 121. Both the measuring shaft 120 and the actuating shaft 121 may have a coupling 128. At the level of the measuring device, the rotary motor 110 may be provided in a first carrier 170 and the linear motor 111 may be provided in a second carrier 171 of the measuring device. The carriers 170, 171 may be attached to a stand 180 and the first carrier 170 may be adjusted in height relative to the second carrier 171 via an actuating part 181 and an actuating spindle 182 by an actuating motor 183. The interplay of the rotating measuring shaft 120 and the linearly movable actuating shaft 121 may enable particularly accurate (rheological) measurements.

The measuring shaft 120 may have the shaft element 120 already described above in the form of a disc. Four ultrasonic sources 131*a-d* may be arranged with respect to the sides of the shaft 120 and the shaft element 125 in such a way that the shaft element 125 may be beared in the axial direction A and in the radial direction R of the shaft 120 without contact by ultrasonic levitation (see in this respect the description of FIG. 4 above). Two (preferably four) ultrasonic devices 130 may be arranged around the actuating shaft 121 in a similar manner as shown in the FIGS. 5 to 7. The emitted ultrasound 135 may ensure that the deflection of the actuating shaft 121 may be limited and the stability may be increased.

Supplementarily, it is to be noted that "having" (or "comprising") does not exclude other elements or steps, and that "a" or "an" does not exclude a plurality. It is further be noted that features or steps, which have been described with reference to any of the above embodiments, may also be used in combination with other features or steps of other embodiment examples described above.

REFERENCE NUMERALS

100, 800 measuring drive
101, 201 measuring device, rheometer
110 motor, rotary motor
111 linear motor
120 shaft, measuring shaft
120*a* first shaft section
120*b* second shaft section
121 actuating shaft
125 shaft element
125*a* first shaft element
125*b* second shaft element
126 interspace
128 coupling
130 ultrasonic device
131*a-d* ultrasonic source
132*a,b* emitter
133*a,b* sonotrode
134 horn
135 ultrasound
150 sample
155 sample carrier
156 measuring element
157 further measuring element
160 control unit
161 capacitive measuring unit
165 torque detector
166 angular encoder
170 first carrier
171 second carrier
180 stand
181 actuating part
182 actuating spindle
183 actuating motor
210 pressure container
211 pressure valve
220 pressure cell
230*a,b* magnets

The invention claimed is:

1. A measuring drive for a rheometer, the measuring drive comprising:
   a motor;
   a shaft which is coupled to the motor in such a way that the shaft is drivable by the motor, the shaft having a shaft element; and
   an ultrasonic device, which is configured to provide ultrasound to the shaft in such a way that at least a part of the shaft is bearable substantially without contact by the ultrasound,
   wherein the ultrasonic device is configured to bear the shaft element substantially without contact both in an axial direction and in a radial direction of the shaft.

2. The measuring drive according to claim 1,
   wherein the ultrasonic device is configured to emit the ultrasound in such a way that at least a part of the shaft is bearable levitatingly by the ultrasound.

3. The measuring drive according to claim 1,
   wherein the ultrasonic device is configured as a standing wave effect ultrasonic device and/or a near field effect ultrasonic device.

4. The measuring drive according to claim 1,
   wherein the motor is a rotational measuring motor, which is configured to rotate the shaft, which is a measuring shaft, in the radial direction.

5. The measuring drive according to claim 1,
   wherein the motor is a linear measuring motor configured to move the shaft, which is an actuating shaft, in the axial direction.

6. The measuring drive according to claim 1,
   wherein the ultrasonic device has at least two ultrasonic sources, which are arranged substantially opposingly to each other, and
   wherein at least a part of the shaft is arranged between the substantially opposing ultrasonic sources.

7. The measuring drive according to claim 3,
   wherein the ultrasonic source has an ultrasonic emitter and a sonotrode,
   wherein the sonotrode is arranged in front of the emitter in the sound emission direction.

8. The measuring drive according to claim 1, wherein the shaft element is coupled to the shaft with its main extension direction oriented substantially perpendicular to the axial direction of the shaft, and
   wherein the ultrasonic device is configured in such a way that the shaft element is bearable substantially without contact by the ultrasound.

9. The measuring drive according to claim 8,
   wherein the ultrasonic device has at least four ultrasonic sources,
   wherein, viewed in the axial direction of the shaft, two ultrasonic sources are arranged above and two ultrasonic sources are arranged below the shaft element, and
   wherein, viewed in the radial direction of the shaft, two ultrasonic sources are arranged substantially opposingly to the other two ultrasonic sources with the shaft in between.

10. The measuring drive according to claim 8,
    wherein the shaft has at least two shaft elements which are spatially spaced apart from each other and thereby form an interspace, and
    wherein the ultrasonic device has at least two ultrasonic sources, which are arranged substantially opposingly to each other in such a way that emitted ultrasound at least partially impinges on the interspace, whereby that at least two shaft elements are bearable substantially without contact.

11. The measuring drive according to claim 8, wherein at least one shaft element has substantially a shape, which is selected from the group that consists of a disc, an annular disc, a plate, a truncated cone, a hemisphere, or a truncated pyramid.

12. A rheometer, for determining an information that is indicative of the rheological properties of a sample, the rheometer, comprising:
a measuring drive including a motor,
a shaft coupled to the motor in such a way that the shaft is drivable by the motor, the shaft having a shaft element, an ultrasonic device configured to provide ultrasound to the shaft in such a way that at least a part of the shaft is bearable substantially without contact by the ultrasound, wherein the ultrasonic device is configured to bear the shaft element substantially without contact both in the axial direction and in the radial direction of the shaft; and
a sample carrier for positioning the sample, wherein the shaft is coupleable to the positioned sample.

13. The rheometer according to claim 12, wherein the sample carrier is arranged between the measuring shaft and the actuating shaft.

14. The rheometer according to claim 12, further comprising:
a measuring unit for measuring the indicative information on the shaft.

15. The rheometer according to claim 12, further comprising:
a hermetically lockable cell,
wherein at least a part of the ultrasonic device, at least a part of the shaft, and the sample carrier are arranged in the hermetically lockable cell; and
a pressure container for charging the hermetically lockable cell with a pressure profile.

16. A method for determining an information that is indicative of the rheological properties of a sample by a rheometer, which has a motor and a shaft coupled to the motor, the shaft having a shaft element, the method, comprising:
providing the sample and coupling the shaft to the sample;
driving the shaft by the motor so that indicative information is transferred to the movement characteristic of the shaft;
emitting ultrasound by an ultrasonic device to the shaft in such a way that at least a part of the shaft is beared substantially without contact by the ultrasound;
emitting ultrasound by the ultrasonic device in such a way that the shaft element is beared substantially without contact in the axial direction and in the radial direction of the shaft; and
detecting the movement characteristics of the shaft to determine the information indicative of the rheological properties of the sample.

17. The method according to claim 16, further comprising:
wherein the shaft element, which is coupled to the shaft with the main extension direction oriented substantially perpendicular to the axial direction of the shaft.

18. The method according to claim 16, wherein detecting includes providing a capacitive measuring unit, for measuring the indicative information on the shaft or shaft element.

19. The method according to claim 16, further comprising:
inserting at least a part of the rheometer, and the sample, into a hermetically locked cell;
wherein the hermetically locked cell is at least partially filled with a gas, which has a higher density than air.

20. The method according to claim 19, further comprising:
providing a pressure container for charging the hermetically locked cell with a pressure profile.

* * * * *